United States Patent [19]

Kealy

[11] 3,925,053
[45] Dec. 9, 1975

[54] SLOW ACTING FERTILIZER

[75] Inventor: Joseph P. Kealy, Winterhaven, Fla.

[73] Assignee: Swift Chemical Company, Chicago, Ill.

[22] Filed: May 14, 1973

[21] Appl. No.: 360,099

[52] U.S. Cl. .................................... 71/29; 71/64 F
[51] Int. Cl.² .................................... C05B 15/00
[58] Field of Search ............ 71/64 F, 64 E, 28, 29, 71/63

[56] References Cited
UNITED STATES PATENTS

| | | | |
|---|---|---|---|
| 2,955,673 | 10/1960 | Kennedy et al. | 55/33 |
| 2,988,439 | 6/1961 | Gloss | 71/1 |
| 3,024,098 | 3/1962 | Austin et al. | 71/29 |
| 3,050,385 | 8/1962 | Parker | 71/64 F |
| 3,070,435 | 12/1962 | Reussen | 71/64 E |
| 3,149,934 | 9/1964 | Martin | 55/62 |
| 3,280,536 | 10/1966 | Berlin | 55/58 |
| 3,322,528 | 5/1967 | Hamamoto et al. | 71/28 X |
| 3,326,665 | 6/1967 | Schafer et al. | 71/28 |
| 3,399,510 | 9/1968 | Kauer, Jr. et al. | 55/33 |
| 3,419,379 | 12/1968 | Goodale et al. | 71/64 E |
| 3,659,399 | 5/1972 | Kauer, Jr. et al. | 55/33 |
| 3,660,068 | 5/1972 | Wilson | 71/63 |
| 3,762,909 | 10/1973 | Davie | 71/1 |

*Primary Examiner*—Charles N. Hart
*Attorney, Agent, or Firm*—Edward T. McCabe; Charles E. Bouton; J. C. Langston

[57] ABSTRACT

Fertilizer compositions which are slowly and uniformly leached and made available to the plant over a relatively long period of time resulting in more efficient utilization of the fertilizer by the plant are provided by bonding fertilizer material with the hemihydrate of calcium sulfate.

6 Claims, No Drawings

SLOW ACTING FERTILIZER

This invention concerns novel, slow-release fertilizer compositions and a method for the manufacture of such compositions. In one aspect, it relates to a composition comprising the hemihydrate of calcium sulfate as an insolubilizing and supporting material for complete plant foods, i.e., those containing assimilable nitrogen, phosphorus and potassium sources. In another aspect it relates to complete fertilizer compositions having trace elements or micronutrients available for plant growth.

The prior art abounds with teachings of slow-release fertilizer material formed by mixing nitrogen, phosphorus and potassium sources with inert, binding materials. Thus kieselguhr, peat moss, vermiculite, diatomaceous earth, sand and various other siliceous materials have been combined with plant foods to retard the generally rapid rate of leaching of the food by rainfall and ground water. Nevertheless, these prior art compositions are relatively readily available and hard rains cause accelerated and wasteful consumption of the highly available plant foods. Further, soaking rains can cause concentration of plant food in the vicinity of the plant roots to such an extent that actual damage is caused to the plant just as if unbonded plant food had been applied directly to the plant root.

Yet, on the other hand, much of the plant food may remain in unavailable, solid form during a dry spell and disappear by run-off during a heavy rainfall. Because of the uncontrollable rate of solubility in water, the plant foods are not assimilated over an extended period of time, as is preferred, and the full benefit of their application is not realized.

These deficiencies are especially detrimental with regard to "garden line" plants such as nursery stock, high cash value crops (highly irrigated), fruit trees, home plants, shrubs and other exotic plants that are as much in need of retained fertilizer content as they are in need of fertilizer application. In this connection, it is becoming increasingly more important to tailor a plant food material to a particular soil condition in order to have plant food available over a substantial period of time.

In tailor making particular plant foods, trace elements are sometimes incorporated for proper growth of certain plants. Most soils have sufficient trace elements (copper, iron, zinc, manganese, boron, molybdenum) present, but quite often deficiencies of one or more of these elements result in wilting, spotting, loss of color, loss of foilage, loss of resistance to disease, etc. When plant foods are used on soils originally having sufficient amounts of trace elements, the supply may be depleted because of the accelerated plant growth caused by optimum major nutrient conditions. This is particularly true when artificial fertilizers are used, since their process of manufacture generally utilizes compounds that are readily available to the plants. Hence, when synthetically produced plant foods are used, it is advisable to add trace elements to the food.

More in detail as to specific formulations, urea, ammonium sulfate, ammonium nitrate, ammonium phosphate, potassium nitrate, potassium sulfate and potassium chloride are representative of many soluble nitrogen, phosphorus and potassium sources. Some prior art formulations contain relatively slow acting nitrogen compounds in the form of urea-forms, natural organics, etc. The rate of availability of the usually soluble sources of nitrogen, phosphorus and potassium can be slowed down by encapsulation with material such as sulphur, resins or plastic coatings. However, such processes are very difficult to control and are extremely expensive.

The need for slow acting phosphorus and potassium sources is apparent in the nursery field because of the soil mixtures used. Usually nursery earth, which consists of artificial potting soils, will not hold nitrogen, phosphorus and potassium sources as well as some soils.

The rate of availability of a nitrogen source can be slowed by selecting higher reaction products of urea with aldehydes. This can be accomplished by combining solid urea-forms or isobutylidene diurea with solid potassium and phosphorus sources. In order to obtain a homogeneous small particle of nitrogen-phosphorus-potassium (isobutylidene diurea and soluble sources of phosphorus and potassium), the long lasting effect of the isobutylidene diurea is reduced by the fact that the isobutylidene diurea must be used in very small particle form in order to end up with a overall 0.7 – 2 mm particle size containing nitrogen-phosphorus-potassium. Since the normal isobutylidene diurea particles are so small, rapid dissolution of the particles in moisture renders the nitrogen available too quickly to plants. In order to have the isobutylidene diurea available for a period of 1 to 3 years, one would have to make particles of 2 – 20 mm in size. However, homogeneous large particles of 2 mm – 20 mm containing nitrogen-phosphorus-potassium disintegrate readily in moist soil with the result that the soluble phosphorus and potassium sources are 100% leached out of the 2 – 20 mm pellet and cause the isobutylidene diurea to present greater surface area for dissolving.

Various means of completely bonding the nitrogen, phosphorus and potassium sources together have been tried. These include compaction methods but the compacted particles, while holding up physically, disintegrate in a matter of minutes upon immersion in water and return quickly to their original form. Another prior art system has succeeded in making particles of 4 – 8 mm size of a 10—10—10 fertilizer using a "fused phosphate" process with isobutylidene diurea. While a "fused phosphate" process is satisfactory in making a complete fertilizer having equal units of nitrogen, phosphorus and potassium, it will not function properly for certain complete fertilizers having unequal units of nitrogen, phosphorus and potassium such as 3—1—2 or 6—1—6 because of the low units of $P_2O_5$ required. In this connection, "garden line" products are relatively high in nitrogen as compared to phosphorus and potassium and, hence, cannot be made by the "fused phosphate" process.

Accordingly, it is one object of this invention to produce a complete plant food that will simultaneously release nitrogen, phosphorus and potassium sources slowly.

Another object of this invention is to provide novel fertilizer compositions having controlled rates of solubility in rain and ground water soils.

Still another object is to provide a fertilizer composition which is capable of adding the secondary plant nutrients of calcium and sulphur to the soil.

Further objects and advantages of this invention, if not specifically set forth herein, will become apparent to one skilled in the art during the reading of the description which follows.

I have discovered that by dispersing and bonding fertilizer material with the hemihydrate of calcium sulfate there is provided a fertilizer composition which will be slowly and uniformly leached and made available to the plant over a relatively long period of time resulting in more efficient utilization of the fertilizer by the plant. The objects of this invention are achieved by taking plant foods, which are prepared in a manner well-known in the art and mixing them with the hemihydrate of calcium sulfate in the ratio of about 19 – 10 parts fertilizer to about 1 – 10 parts of calcium sulfate hemihydrate. Sufficient water for crystallization is added to provide two molecules of water for each molecule of calcium sulfate and the resulting mixture is compressed or granulated to form a pellet fertilizer material. $CaSO_4 \cdot 2H_2O$ has an approximate solubility of 0.2 g/100g.$H_2O$ while isobutylidene diurea has a solubility of 0.1 g/100g.$H_2O$ to 0.2 g./100 g.$H_2O$.

The pelleted form can then be placed in the soil to provide plant nutrients which will be slowly leached from the pellet as well as the pellet being slowly dissolved in toto. This occurs because the $CaSO_4 \cdot 2H_2O$ is a crystalline structure that allows water penetration. It also dissolves at a faster rate than the other ingredients thus allowing incremental spherical shells of $CaSO_4 \cdot 2H_2O$ to be dissolved away exposing the assimilable N-P-K within the incremental spherical shell. The N-P-K that was in this incremental shell is now in direct contact with the soil water.

In the preferred embodiments of the invention, steam and hot water are used to heat the plant food ingredients and to crystallize the calcium sulfate hemihydrate to the dihydrate form. The use of ambient tap water resulted in one to two hour set times. The use of steam and hot water produced granules set hard enough that they could be handled in about 8 minutes and could be tumble dried in 20 to 30 minutes. Total water for crystallization and granulation might vary between about 10% to about 25% based on the weight of the plant food and the calcium sulfate hemihydrate and the degree of size granulation desired.

While the basic concept of this invention relates to the crystallization of calcium sulfate hemihydrate in intimate contact with plant food ingredients, $CaSO_4 \cdot 2H_2O$ (gypsum) can also be used in a finely divided state as the binder in compaction of a fertilizer mixture. The preferred procedure is to first steam heat the plant food ingredients to a temperature between 140°F. and about 210°F. for about 1 to 3 minutes so as to have a moisture content of between about 2% and about 8% prior to mixing with the calcium sulfate hemihydrate. After the plant food ingredients are steam heated, preferably to about 160°F.–190°F. in the mixer, calcium sulfate hemihydrate is charged, followed by about 10% to 20%, by weight, of hot water usually in excess of about 150°F. and preferably in the range of about 170°F.–210°F. The granule mixture can then be steamed for a minute or two, followed by tumble drying for about 20 to 30 minutes, provided enough set of the calcium sulfate dihydrate has occurred and the granules are hard enough. In some cases where the granules are not firm enough, a holding time of 10 to 15 minutes is necessary before tumble drying.

Illustrations of the assimilable nitrogen component useful in this invention are condensation products of urea and N-butyraldehyde, isobutyraldehyde or crotonaldehyde which contain urea and aldehyde in a proportion of about 1:1 to 10:1, preferably about 1.8–2.5:1 and more particularly 2:1. These types of products are not new in the art and hence a detailed description of their preparation will not be given. It will suffice to recite a general description of the type of material. The reaction product of two molecules of urea with one molecule of aldehyde has the structure of alkylidene diureides. The condensation products can be prepared by contacting the aldehyde in aqueous solution with about at least twice the molar quantity of urea, preferably while adding small quantities of inorganic or organic acids and isolating the condensation product by known methods.

When isobutylaldehyde is added to the aqueous urea solution, only some of it dissolves while the rest floats. By means of stirring, however, the reaction slurry forms in the water phase and the aldehyde in the upper layer dissolves with an exothermic reaction and forms a homogeneous phase. Subsequently, fine, insoluble material precipitates and the reaction is nearly complete in about 10 to 30 minutes. In the case where a concentrated aqueous urea solution having a concentration of more than 25 to 30% is employed as the starting material, the reaction mixture becomes almost entirely solid. When a more diluted aqueous urea solution is employed the reaction mixture remains a slurry. However, in either case it is possible to easily separate the reaction product from said reaction mixture by way of subsequent simple treatment such as filtration, washing and drying. The solid products contain for the most part slightly soluble isobutylidene diurea and unreacted urea.

The chemical reaction can be represented by the following formula using isobutylaldehyde as representative of the aldehydes:

$$\begin{matrix}CH_3\\CH_3\end{matrix}\!\!>\!\!CH-CHO + 2NH_2CONH_2 \rightarrow$$
isobutylaldehyde   urea

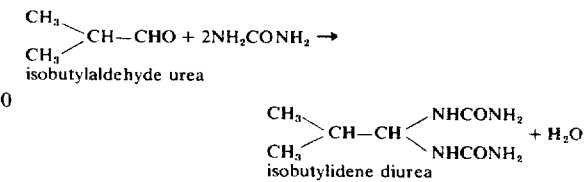

isobutylidene diurea

In carrying out the reaction, the molar ratio of urea to isobutylaldehyde is in the range of about 2 to 10, preferably 2 to 5 so that the amount of urea remaining in the reaction product, i.e., free urea contained in the fertilizer according to the invention may be present in amounts desired. If desired, however, an amount of urea less than the equivalent mol of isobutylaldehyde may be employed.

An acid reaction system is preferred because of the faster rate of reaction, however, the system may be conducted under either neutral or basic conditions. A temperature in the range of from about 10°C. to 120°C. may be employed, usually 90°C. to about 110°C. In order to avoid the loss of isobutylaldehyde, the reaction is conducted in a closed vessel using urea concentrations of about 50%, by weight, or less ammonium chloride. Other assimilable nitrogen sources include urea ammonium sulfate, ammonium nitrate, and ammonium phosphates. Illustrative of the assimilable phosphorus and potassium components of this invention are vitreous masses produced by fusion and fritting. These vitreous masses contain 50% to 100% matrix and chemically combined therewith are from 0% to 50% of at least one of the minor elements of copper, zinc, manganese, iron, boron, cobalt and molybdenum. The glassy matrix of the vitreous composition contains ingredients such as $SiO_2$, $K_2O$, $P_2O_5$, MgO, $Na_2O$, CaO, etc. Generally speaking, the entire vitreous mass contains from about 26% to about 85% $SiO_2$. In addition to the $SiO_2$, the matrix comprises 1 to 20% $K_2O$ and 1% to 25% $P_2O_5$.

As discussed in the former parts of this specification, the importance of minor elements in plant nutrition is well known to those skilled in the art of plant physiology. Accordingly, the vitreous mass of this composition may contain 0 to 50% of a minor element. In addition, the vitreous mass has an extraction value of 50 parts per million to 7,500 parts per million when extracted by the ammonium acetate extraction tests. Other assimilable components include monoammonium phosphate, diammonium phosphate, potassium chloride, potassium sulfate, triple superphosphate, etc.

It is sometimes desirable that all ingredients comprising the pellets of this invention have about the same solubility. $CaSO_4 \cdot 2H_2O$ is soluble to the extent of 0.2 g/100 g. $H_2O$ which is close to isobutylidene diurea of 0.1 g/100 g. $H_2O$. Highly insoluble phosphorus and potassium sources such as meta and polyphosphates are quite useful. In fact, good results can be achieved by using phosphorus and potassium sources having a solubility of less than about 10 g./100 g. of water.

The pellets will usually range between 1 mm and 25 mm, the larger pellets (over 5 mm) being useful for nursery stock, high cash value crops, home plants, shrubs, trees and golf greens.

The following examples illustrate the invention.

EXAMPLE I

| Raw Materials | Grams/batch |
|---|---|
| Isobutylidene diurea (.7 mm–1.4 mm) | 774 |
| (0–15–30) Ferro Frit (Fused $K_2O$ and $P_2O_5$) | 553 |
| Calcium sulfate hemihydrate | 620 |
| Water for crystallization | 73 |
| | 2000 g. |

Water for granulation (73 gm. for crystal + 327 gm.) = 400 gm. The above dry, raw materials were mixed in a four liter rolling laboratory mixer that was tilted so as to represent a tilted pan granulator. Water was added until agglomeration of particles was in the range of 5 mm to 20 mm. This amounted to about 20% water. The product was air dried for about 10 minutes and then dried at 180°F.

| Screen Size Yield | | U.S. Sieve No. |
|---|---|---|
| −¾ | +½ | 7.6% |
| −½ | +¼ | 34.9 |
| −3 | +4 | 21.8 |
| ″4 | +5 | 14.3 |
| −5 | +6 | 10.5 |
| −6 | +8 | 6.7 |
| −8 | +10 | 0.4 |
| −10 | +12 | 0.1 |
| −12 | +12T | 0.8 |
| −12 | +20 | 2.5 |
| −20 | | 0.4 |
| | | 100.0% |

Various formulations and sizes were placed in 100 grams of water to ascertain their rate of solution weekly. Weight dissolution test in a two week period. About 100 cc of fresh water used each week.

Frit = fused $K_2O$ and $P_2O_5$
IBDU = isobutylidene diurea
POP = calcium sulfate hemihydrate

| | | | Percent Weight Dissolved | |
|---|---|---|---|---|
| Sample Description | | Pills Diameter | First Week | Second Week |
| 1. | 9-4-8 (Frit & IBDU) POP −⅝ + ⅜ | 15 mm | 15.9 | 23.5 |
| 2. | 9-4-8 (Frit & IBDU) POP −⅝ + 3 | 10 mm | 20.0 | 32.9 |
| 3. | 9-4-8 (Frit & IBDU) POP −3 + 4 | 6.5 mm | 47.3 | 57.5 |
| 4. | 9-4-8 (Frit & IBDU) POP −4 + 8 | 6 mm | 61.5 | 74.1 |
| 5. | 16-0-0 POP −⅝ + ⅜ | 16 mm | 10.1 | 25.0 |
| 6. | 16-0-0   −⅝ + 3 | 10 mm | 18.5 | 80.0 |
| 7. | 16-0-0   −3 + 4 | 8 mm | 49.8 | 85.2 |
| 8. | 16-0-0   −4 + 8 | 6 mm | 77.5 | 86.7 |

EXAMPLE II 1290 grams of isobutylidene diurea was charged into a granulator and contacted with steam for 2 minutes thereby raising the temperature of the charge to 190°F. Calcium sulfate hemihydrate in an amount of 635 grams was charged in and hot water (200°F.) in an amount of 280 grams, by weight, was added. The mixture was again treated with steam for about 30 seconds and then granulated for about 4 minutes. Granules were held 20 minutes before drying. The granules were tumble dried for 30 minutes.

EXAMPLE III

GRADE (0–20.7–20.2)

879 grams of Triple Superphosphate and 673 grams of Potassium Chloride were charged to a granulator and contacted with steam for about 2 minutes thereby raising the temperature of the charge to 190°F. Calcium Sulfate Hemihydrate in an amount of 400 grams was charged in and mixed in 2 minutes and hot water (200°F.), 80 grams, was added. The mixture was again rolled 4 minutes. The granules were held for 2 hours then mixture was rolled dry in 30 minutes.

EXAMPLE IV

GRADE (12–0–12)

402 grams of Potassium Chloride and 1150 grams of Ammonium Sulfate were charged to the granulator. Steam was added for 2 minutes and then Calcium Sulfate Hemihydrate was added and mixed for 2 minutes. Hot water (200°F.), 325 grams, was added and mixed for 4 minutes. After holding the granules for 15 minutes, they were dried for 30 minutes.

EXAMPLE V

GRADE (14–3–7)

100 grams of monoammonium phosphate, 233 grams of Potassium Chloride and 1277 grams of Ammonium Sulfate were charged to a granulator and contacted with steam for about 2 minutes, temperature reached 190°F. Calcium Sulfate Hemihydrate, 348 grams, was added and mixed in for 2 minutes. Hot (200°F.) water, 215 grams, was added. After rolling for 4 minutes and holding granules for 15 minutes, the mix was dried for 20 minutes.

EXAMPLE VI

GRADE (22–5–11)

167 grams of monoammonium phosphate, 367 grams of Potassium Chloride and 913 grams of Urea were charged to granulator. Steam was added for 1½ minutes to temperature of 150°F. Calcium Sulfate Hemihydrate, 493 grams, was added and mixed for 2 minutes. Hot water, 115 grams, was added and mix rolled for 4 minutes. Granules were held for 15 minutes before drying for 20 minutes.

EXAMPLE VII

GRADE (12–2–6)

68 grams of monoammonium phsophate, 1104 grams of Ammonium Sulfate and 200 grams of Potassium Chloride were charged to the granulator. Steam was added for 2 minutes then Calcium Sulfate Hemihydrate was added and mixed for 2 minutes. Hot (200°F.) water, 325 grams, was added and mixture rolled for 4 minutes. After holding the granules for 20 minutes they were dried for 30 minutes.

SCREEN ANALYSIS

| USSTD. | EX. III | EX. IV | EX. V | EX. VI | EX. VII |
|---|---|---|---|---|---|
| | GRAMS | GRAMS | GRAMS | GRAMS | GRAMS |
| + ⅜" | 0 | 15 | 7 | 4 | — |
| − ⅜" + ⅜" | 2 | 35 | 8 | 27 | 13 |
| − ⅜" + ¼" | 24 | 103 | 31 | 70 | 57 |
| − ¼" + 4 | 28 | 105 | 22 | 55 | 48 |
| − 4 + 6 | 69 | 115 | 51 | 86 | 87 |
| − 6 + 8 | 145 | 35 | 82 | 64 | 207 |
| − 8 + 10 | 51 | 3 | 43 | 26 | 86 |
| − 10 + 12 | 34 | 2 | 48 | 30 | 61 |
| − 12 + 20 | 39 | 7 | 94 | 31 | 64 |
| − 20 | 6 | 2 | 22 | 3 | 9 |

BREAKING FORCE (POUNDS)

| EX. III | | EX. IV | | EX. V | | EX. VI | | EX. VII | |
|---|---|---|---|---|---|---|---|---|---|
| DIA MM. | READING | DIA MM. | READING | DIA MM. | READING | DIA MM. | READING | DIA MM. | READING |
| 9 | 5.8 | 11 | 12.0 | 12 | 7.5 | 15 | 22 | 12 | 6.4 |
| 8 | 6.0 | 10 | 14.0 | 10 | 7.0 | 12 | 9.9 | 10 | 6.4 |
| 7 | 3.9 | 9 | 10.1 | 10 | 7.0 | 9 | 6.6 | 8 | 5.4 |
| 6 | 3.4 | 8 | 10.1 | 9 | 5.4 | 9 | 6.6 | 7 | 5.4 |
| 6 | 3.4 | 6 | 6.1 | 7 | 4.4 | 7 | 5.9 | 5 | 3.8 |
| 5 | 2.3 | 6 | 6.1 | 5 | 3.1 | 6 | 5.4 | 5 | 3.8 |
| 4 | 2.0 | 5 | 6.4 | 5 | 3.1 | 5 | 4.2 | 3.5 | 2.7 |
| 2 | 1.5 | 4 | 3.9 | 5 | 3.1 | 3 | 3.9 | | |
| | | 4 | 3.9 | 4 | 2.5 | | | | |
| | | 3 | 2.9 | | | | | | |

Obviously many modifications and variations of the invention as hereinbefore set forth may be made without departing from the spirit and scope thereof, and, therefore, only such limitations should be imposed as are indicated in the appended claims.

I claim:

1. A highly insoluble granular fertilizer that will simultaneously release all plant food sources slowly and uniformly over a long period of time, which fertilizer contains about ten percent to about 50 percent, by weight, of hydrated calcium sulfate and about 90 percent to about 50 percent of isobutylidene diurea, said calcium sulfate being hydrated and crystallized while in intimate contact with the said isobutylidene diurea so as to produce a homogeneously bound fertilizer having controlled rates of solubility.

2. The fertilizer of claim 1 wherein the granules contain homogeneously bound highly insoluble phosphorus and potassium sources.

3. The fertilizer of claim 1 wherein the phosphorus and potassium sources are vitreous masses of $K_2O$ and $P_2O_5$.

4. The fertilizer of claim 1 wherein the granules are pellets of about 5 mm. to about 25 mm.

5. The fertilizer of claim 4 wherein the granules contain homogeneously bound highly insoluble phosphorus and potassium sources.

6. The fertilizer of claim 4 wherein the phosphorus and potassium sources are vitreous masses of $K_2O$ and $P_2O_5$.

* * * * *